W. COURTENAY.
Harness-Loop.

No. 195,885.  Patented Oct. 9, 1877.

WITNESSES
Wm A. Skinkle
Henry T. Earnest

INVENTOR
William Courtenay,
By his Attorneys
Baldwin, Hopkins & Peyton.

UNITED STATES PATENT OFFICE.

WILLIAM COURTENAY, OF NEW YORK, N. Y.

IMPROVEMENT IN HARNESS-LOOPS.

Specification forming part of Letters Patent No. 195,885, dated October 9, 1877; application filed May 18, 1877.

*To all whom it may concern:*

Be it known that I, WILLIAM COURTENAY, of the city, county, and State of New York, have invented a new and useful Improvement in Harness-Loops, of which the following is a specification:

The object of my invention is to produce a durable harness-loop of ornamental appearance, possessing the capacity of resisting the action of heat, moisture, oils, and acids, which ends I attain by molding harness-loops of vulcanized fiber, which material, although but recently discovered, is now well known in the arts; and consists of vegetable fiber treated with chloride of zinc in accordance with the specifications of United States Letters Patent No. 113,454, dated April 4, 1871, and No. 120,380, dated October 31, 1871.

Figure 1:
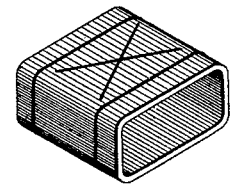
Figure 2:
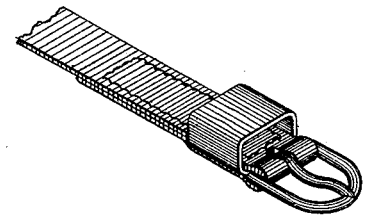

In the accompanying drawings, Figure 1 represents a view, in perspective, of my improved harness-loop; and Fig. 2, a similar view of the same stitched in position on the harness.

My improved loops may be made in either of two well-known ways: First, by winding the material in its pulpy state around a mandrel of suitable size and form, and then, after soaking and drying, as described in Letters Patent No. 113,454, above mentioned, passing it, while still upon the mandrel, between grooved rollers under heavy pressure, whereby it is perfectly finished both inside and out, as well as formed of the proper shape. The embossing or ornamentation may be done at the same time by means of suitable devices upon the rollers themselves, and the tubes may be made of a length sufficient for several loops, and cut into lengths as desired. Second, sheets of vulcanized fiber may be cut into strips of proper width, the edges chamfered, partially dissolved in a solution of chloride of zinc, formed upon a mandrel, and the edges cemented by heat and pressure, and then washed to remove the chloride of zinc, and allowed to dry upon the mandrel, which must be made collapsible, or in sections, so as to admit of its withdrawal from the tube after its formation.

I have discovered and demonstrated by experiment that harness-loops thus formed are durable, retain their form better, and possess greater capacity for resisting the action of heat, moisture, oils, and acids, than leather, and may, besides, be made of any color desired.

I claim as of my own invention and desire to secure by Letters Patent—

A molded harness-loop of vulcanized fiber, as a new article of manufacture.

In testimony whereof I have hereunto subscribed my name.

W. COURTENAY.

Witnesses:
    FRANCIS P. BURKE,
    GEO. WAGNER.